United States Patent [19]

Kuriki

[11] Patent Number: 5,144,672
[45] Date of Patent: Sep. 1, 1992

[54] SPEECH RECOGNITION APPARATUS INCLUDING SPEAKER-INDEPENDENT DICTIONARY AND SPEAKER-DEPENDENT

[75] Inventor: Shoji Kuriki, Yokohama, Japan

[73] Assignee: Ricoh Company, Ltd., Japan

[21] Appl. No.: 589,516

[22] Filed: Sep. 28, 1990

[30] Foreign Application Priority Data

Oct. 5, 1989 [JP] Japan .................................. 1-261097
Oct. 5, 1989 [JP] Japan .................................. 1-261098
Jul. 27, 1990 [JP] Japan .................................. 2-200149

[51] Int. Cl.⁵ ................................................ G10L 5/00
[52] U.S. Cl. ......................................... 381/41; 381/43
[58] Field of Search .................................. 381/41–46, 381/50; 395/2

[56] References Cited

U.S. PATENT DOCUMENTS 4,694,493 9/1987 Sakoe ..................................... 381/42
4,910,782 3/1990 Watari .................................... 381/42

FOREIGN PATENT DOCUMENTS 0191354 8/1986 European Pat. Off. .
3216800 12/1982 Fed. Rep. of Germany .
3129282 2/1983 Fed. Rep. of Germany .
3129353 2/1983 Fed. Rep. of Germany .

OTHER PUBLICATIONS

Ser. No. 07/566,884 filed Aug. 13, 1990 by Ariyoshi et al.

Primary Examiner—Michael R. Fleming
Assistant Examiner—Michelle Doerrler
Attorney, Agent, or Firm—Mason, Fenwick & Lawrence

[57] ABSTRACT

A speech recognition apparatus includes an input unit, a pattern generator, a speaker-independent dictionary for storing a first group of reference patterns, and a speaker-dependent dictionary for storing a second group of reference patterns. The apparatus also includes a dictionary information storing unit which stores dictionary information about the first group of reference patterns and the second group of reference patterns, and a weighting unit which calculates a weighting factor from the dictionary information and which weights the second group of reference patterns in the speaker-dependent dictionary by using the weighting factor to thereby output weighted reference patterns. Further, the apparatus includes a recognition unit which recognizes the speech pattern generated by the pattern generator by using the first group of reference patterns in the speaker-independent dictionary and the weighted reference patterns supplied from the weighting unit, so that the first group of reference patterns and the weighted reference patterns are equally handled.

8 Claims, 7 Drawing Sheets

→ FREQUENCY

```
0011001000000000
0011000010000000
0011000011000000
0011000011000000
0011100011100000
0011100011100000
0001100011100000
0001100011000000
................
................
................
0010100001000000
```

↓ TIME

FIG.3A

REFERENCE PATTERN TO BE REGISTERED IN SPEAKER-INDEPEDENT DICTIONARY

FIG.3B

REFERENCE PATTERN TO BE REGISTERED IN SPEAKER-DEPENDENT DICTIONARY

SPEECH RECOGNITION APPARATUS INCLUDING SPEAKER-INDEPENDENT DICTIONARY AND SPEAKER-DEPENDENT

BACKGROUND OF THE INVENTION

The present invention generally relates to a speech recognition apparatus, and more particularly to a speech recognition apparatus using a binary time-spectrum pattern. More specifically, the present invention is concerned with a speech recognition apparatus using a speaker-independent dictionary and a speaker-dependent dictionary.

Conventionaly, a speaker-independent dictionary and a speaker-dependent dictionary provided in a speech recognition apparatus are selectively used on the basis of a speaker which uses the speech recognition apparatus. In such a speech recognition apparatus, two speech recognition parts are provided respectively for the speaker-independent dictionary and the speaker-dependent dictionary, because reference patterns registered in the speaker-independent dictionary are created by a procedure different from that for creating reference patterns registered in the speaker-dependent dictionary. A word spoken by a speaker is recognized separately by the two speech recognition parts and respective recognition results are obtained. Then, one of the two recognition results is selected based on a predetermined rule.

However, conventional speech recognition apparatuses as described above need two separate recognition parts, and a huge amount of calculation is needed to adjust the recognition results obtained by using the speaker-independent dictionary and the recognition results obtained by using the speaker-dependent dictionary.

SUMMARY OF THE INVENTION

It is a general object of the present invention to provide an improved speech recognition apparatus in which the above-mentioned disadvantages are eliminated.

A more specific object of the present invention is to provide a speech recognition apparatus having a single recognition part which is capable of recognizing a word by using a speaker-independent dictionary and a speaker-dependent dictionary.

The above-mentioned objects of the present invention are achieved by a speech recognition apparatus comprising:

input means for receiving an input speech signal and for extracting features from the input speech;

pattern generating means, coupled to the input means, for generating a speech pattern of the input speech from the features extracted by the input means, the speech pattern having a time-spectrum pattern showing frequency elements obtained at predetermined intervals;

a speaker-independent dictionary for storing a first group of reference patterns, each obtained by adding a plurality of time-spectrum patterns of an identical word uttered by different speakers;

a speaker-dependent dictionary for storing a second group of reference patterns, each obtained by adding time-spectrum patterns of an identical word uttered by an identical speaker;

dictionary information storing means, coupled to the speaker-independent dictionary and the speaker-dependent dictionary, for storing dictionary information about the first group of reference patterns and the second group of reference patterns;

weighting means, coupled to the speaker-dependent dictionary and the dictionary information storing means, for calculating a weighting factor from the dictionary information and for weighting the second group of reference patterns in the speaker-dependent dictionary by using the weighting factor to thereby output weighted reference patterns; and recognizing means, coupled to the pattern generating means, the speaker-independent dictionary and the weighting means, for recognizing the speech pattern of the input speech singal generated by the pattern generating means by using the first group of reference patterns in the speaker-independent dictionary and the weighted reference patterns supplied from the weighting means, so that the first group of reference patterns and the weighted reference patterns are equally handled.

BRIEF DESCRIPTION OF THE DRAWINGS

Other objects, features and advantages of the present invention will become more apparent from the following detained description when read in conjunction with the accompanying drawings, in which.

DESCRIPTION OF THE PREFERRED EMBODIMENTS

Figure 1:
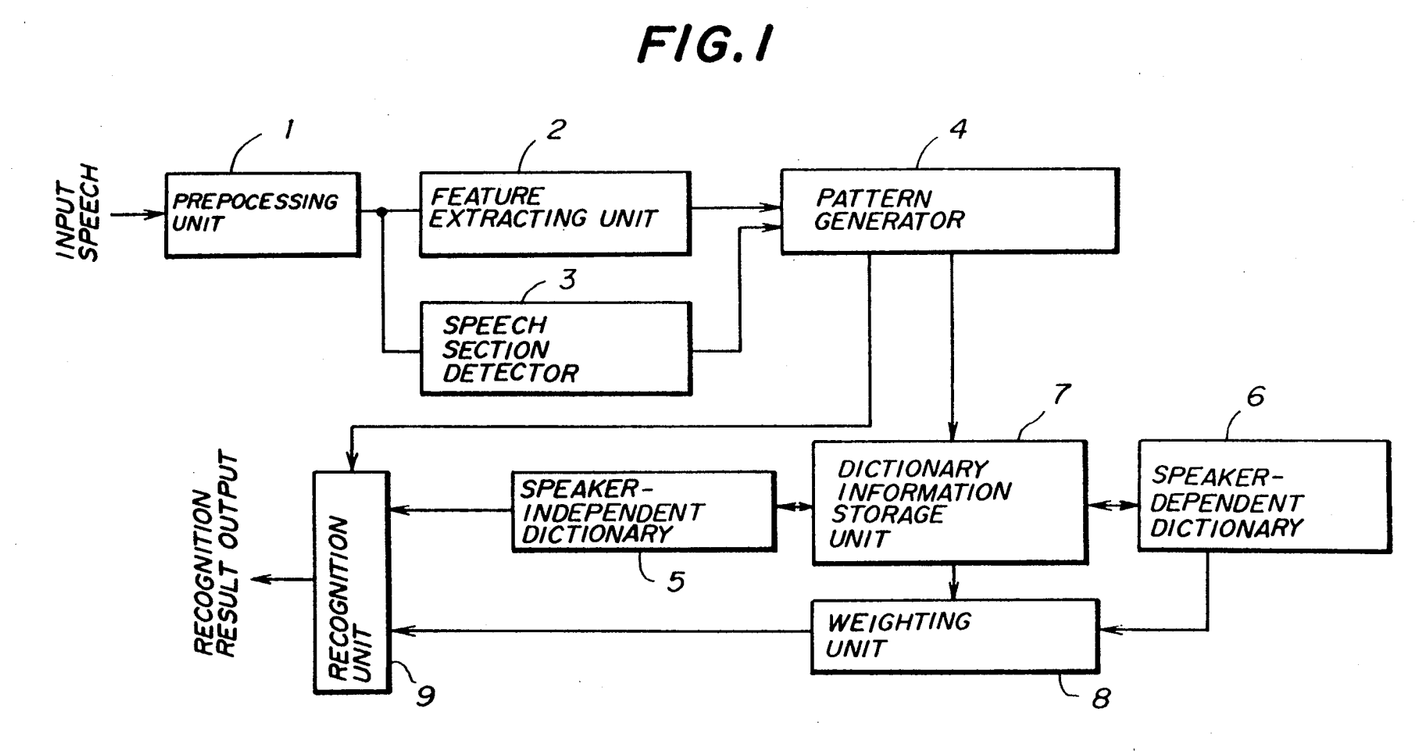
FIG. 1 is a block diagram of a speech recognition apparatus according to a preferred embodiment of the present invention.

Referring to FIG. 1, there is illustrated a speech recognition apparatus according to a preferred embodiment of the present invention. The speech recognition apparatus shown in FIG. 1 is composed of a preprocessing unit 1, a feature extracting unit 2, a speech section detector 3, a pattern generator 4, a speaker-independent dictionary 5, a speaker-dependent dictionary 6, a dictionary information storage unit 7, a weighting unit 8, and a recognition unit 9.

A speech input output by a microphone (not shown) is input to the preprocessing unit 1, which amplifies the speech signal and emphasizes high-frequency components thereof. Further, in the preprocessing unit, the speech signal having the emphasized high-frequency components passes through an AGC circuit and a filter bank composed of a plurality of bandpass filters. The above-mentioned operation of the preprocessing unit 1 is conventional.

A preprocessed speech signal thus obtained is input to the feature extracting unit 2 and the speech section detector 3. The feature extracting unit 2 extracts features of the preprocessed speech signal output from the preprocessing unit 1 in a conventional process. For example, the feature extracting unit 2 extracts power spectra or LPC cepstra from the preprocessed speech signal. The features extracted by the feature extracting unit 2 are sent to the pattern generator 4. The speech section detector 3 detects a speech section (word) in the preprocessed speech signal by monitoring the level thereof. A speech section starts when the level of the preprocessed speech signal exceeds a predetermined threshold level, and this speech section ends when the level thereof becomes equal to or less than the predetermined threshold level. The speech sections thus obtained are sent to the pattern generator 4. The pattern generator 4 generates a binary time-spectrum pattern for every speech section in a conventional way (see J. Fujimoto et al., "A SPOKEN WORD RECOGNITION METHOD BY BINARY TSP MATCHING", Ricoh Technical Report No. 11, May 1984, pp. 4–12).

Figure 2:
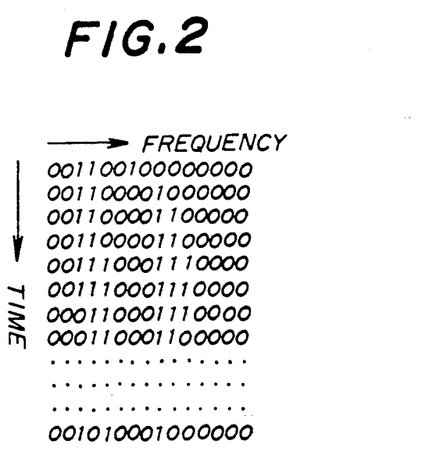
FIG. 2 is a diagram illustrating an example of a binary time-spectrum pattern.

FIG. 2 illustrates an example of a binary time-spectrum pattern generated and output by the pattern generator 4. The horizontal direction in FIG. 2 denotes the frequencies of the binary time-spectrum pattern, and the vertical direction denotes the time passage. The frequency of the binary time-spectrum pattern increases toward the right side of the drawings. The binary time-spectrum pattern includes a plurality of frames obtained at predetermined intervals. For example, the beginning frame of the binary time-spectrum pattern shown in FIG. 2 is "001100100000000" where "0" or "1" is the value of each element. In the example shown in FIG. 2, the frequency axis is divided into 15 frequency ranges. It is determined, for each of said frequency ranges, whether or not there the acoustic power is equal to or greater than a predetermined threshold value. When the acoustic power is equal to or greater than the predetermined threshold value, "1" is provided for the corresponding frequency range. On the other hand, when the acoustic power is less than the predetermined threshold value, "0" is provided for the the corresponding frequency range.

The speaker-independent dictionary 5 stores reference time-spectrum patterns of words obtained in a manner which will be described later. The speaker-dependent dictionary 6 stores reference time-spectrum patterns of words obtained in a manner which will be described later. The dictionary information storage unit 7 receives dictionary information (which will be described later) from the speaker-independent dictionary 5 and the speaker-dependent dictionary 6. Further, the dictionary information storage unit 7 writes reference patterns which are created in manners shown in FIGS. 3A and 3B (which will be described later) into the speaker-independent dictionary 5 and the speaker-dependent dictionary 6.

The weighting unit 8 reads out a reference time-spectrum pattern from the speaker-dependent dictionary 6 and weights the readout recognition time-spectrum pattern in a manner which will be described in detail later. A weighted reference time-spectrum pattern generated and output by the weighting unit 8 is sent to the recognition unit 9, and a reference time-spectrum pattern read out from the speaker-independent dictionary 5 is sent to the recognition unit 9. The reference unit 9 executes a multiplication operation on elements (spectral components) at corresponding positions of the weight reference pattern and the binary time-spectrum pattern of the input speech output by the pattern generator 4, and calculates the sum of the results of the multiplication operation. The sum thus obtained indicates a degree of similarly of the input speech to the reference pattern being considered. Similarly, the recognition unit 9 executes a multiplication operation on elements at corresponding positions of the reference pattern read out from the speaker-independent dictionary 5 and the input pattern supplied from the pattern generator 4, and calculates the sum of the results of the multiplication operation. In the above-mentioned manner, a plurality of word candidates are obtained. The recognition unit 9 outputs the candidate having the highest degree of similarity (largest value of the sum) as the recognition result. It is also possible to use another known recognition process. For example, additional element may be added in the recognition procedure.

Figure 3A:
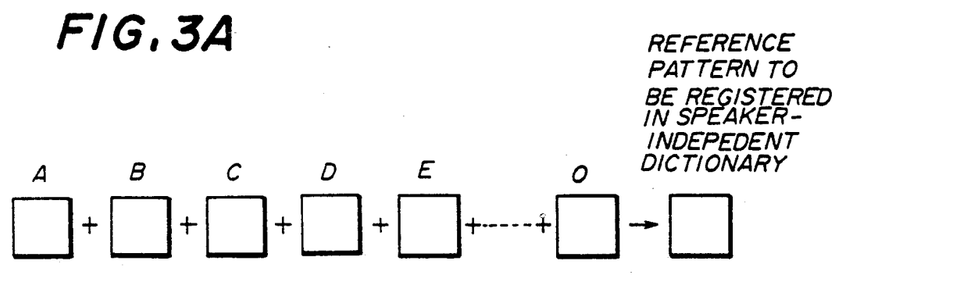
FIG. 3A is a diagram illustrating how to create a reference pattern which is to be registered in a speaker-independent dictionary shown in FIG. 2.

FIG. 3A illustrates how to create a reference time-spectrum pattern which is to be registered in the speaker-independent dictionary 5. Different speakers A, B, C, D, E, ..., O utter the same word and binary time-spectrum patterns of the same word uttered by the speakers are generated and added, so that a single reference time-spectrum pattern of the word being considered is created. Of course, it is possible to change the speakers for each word to be registered.

Figure 3B:
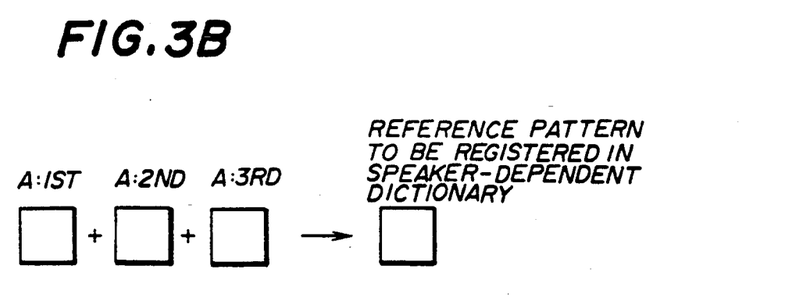
FIG. 3B is a diagram illustrating how to create a reference pattern which is to be registered in a speaker-dependent dictionary shown in FIG. 2.

FIG. 3B illustrates how to create a reference pattern which is to be registered into the speaker-dependent dictionary 6. Speaker A utters the same word three times, and the respective binary time-spectrum patterns are generated and added, so that a single reference time-spectrum pattern of the word related to speaker A is created.

Figure 4:
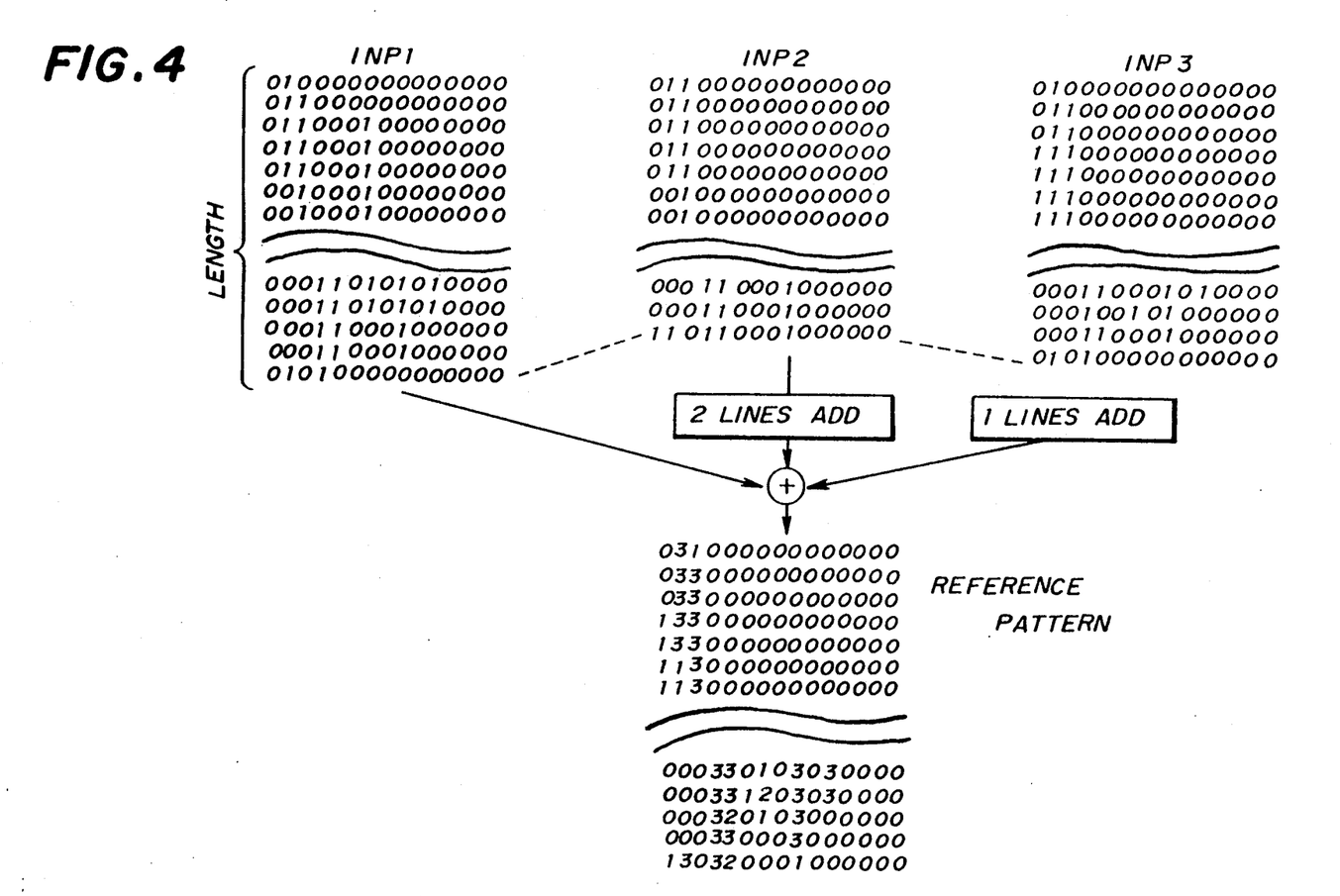
FIG. 4 is a diagram illustrating how to add patterns of the same word uttered by an identical speaker.

Referring to FIG. 4, speaker A utters a word three times, and the respective binary time-spectrum patterns INP1, INP2 and INP3 are generated. These patterns INP1, INP2 and INP3 are added, and thus a reference pattern is created. The pattern INP1 has the greatest word length on the time base. Thus, two lines (frames) are added to the pattern INP2, and one line is added to the pattern INP3. For example, the two lines which are to be added to the pattern INP2 are respectively formed of the last frame (line).

Figure 5:
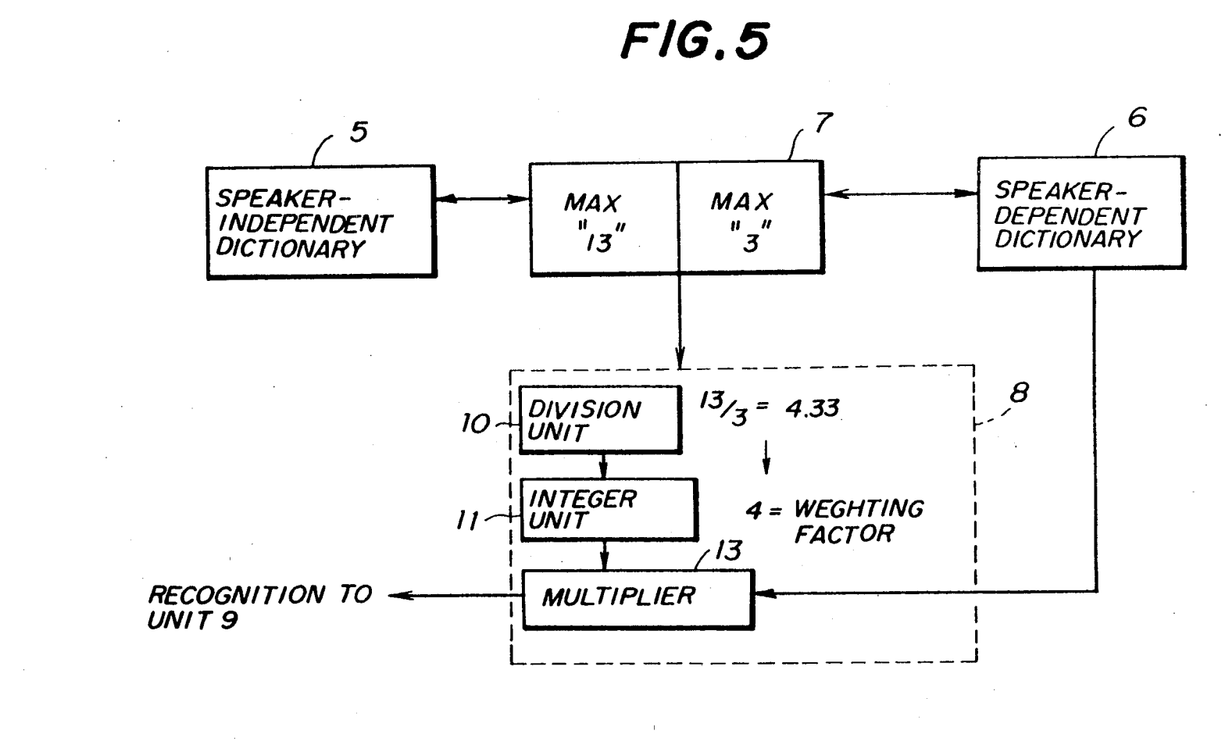
FIG. 5 is a block diagram illustrating the structures and operations of a dictionary information storage unit and a weighting unit shown in FIG. 2.

FIG. 5 illustrates the structures and operations of the dictionary information storage unit 7 and the weighting unit 8. The dictionary information storage unit 7 stores dictionary information on the reference patterns registered in the speaker-independent dictionary 5 and the speaker-dependent dictionary 6. The dictionary information used in FIG. 5 is composed of the maximum value of the elements of the reference time-spectrum patterns registered in the speaker-independent dictionary 5 and the maximum value of the elements of the reference patterns registered in the speaker-dependent dictionary 6. In the case in FIG. 5, the maximum value of the elements related to the speaker-independent dictionary 5 is equal to 13, and the maximum value of the elements related to the speaker-dependent dictionary 6 is equal to 3.

The weighting unit 8 shown in FIG. 5 is composed of a division unit 10, an integer unit 11 and a multiplier 13.

The division unit 10 divides the maximum value related to the speaker-independent dictionary 5 by the maximum value related to the speaker-dependent dictionary 6. In the case shown in FIG. 5, the division unit 10 divides 13 by 3, and outputs 4.333 . . . The integer unit 11 extracts an integer part from the divided result. In the case shown in FIG. 5, the integer unit 11 outputs 4. The integer output by the integer unit 11 is a weighting factor. The multiplier 13 multiplies the reference pattern read out from the speaker-dependent dictionary 6, more specifically, each element contained therein, by the weighting factor. In the case shown in FIG. 5, each reference pattern read out from the speaker-dependent dictionary 6 is quadrupled due to the multiplication of the weighting factor. Then, the quadrupled reference pattern is output to the recognition unit 9.

It is possible to write the dictionary information by searching the speaker-independent dictionary 5 and the speaker-dependent dictionary under the control of the dictionary information storage unit 7. Alternatively, it is possible to write the dictionary information when reference patterns are registered in the dictionaries 5 and 6.

It will be noted that the procedure shown in FIG. 3B for creating the reference patterns to be registered in the speaker-dependent dictionary 6 is different from that shown in FIG. 3A for creating the reference patterns to be registered in the speaker-independent dictionary 5. Thus, it is impossible to handle the recognition results obtained by simply using the reference patterns obtained by the different procedures in the single recognition unit 9. That is, it is necessary to compensate for differences in the reference patterns obtained by the different procedures to thereby handle these reference patterns on an equalized condition. This is achieved by the weighting unit 8 having the above-mentioned structure and operation.

Figure 6:
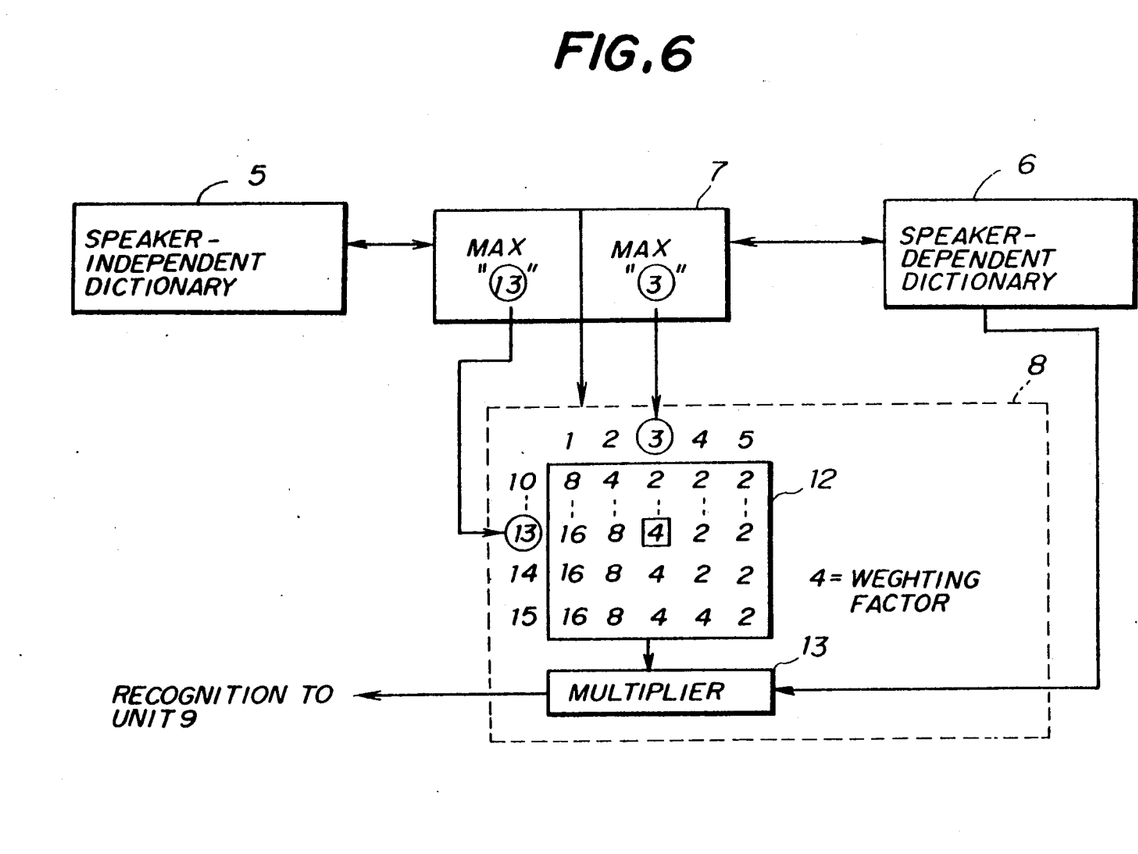
FIG. 6 is a block diagram illustrating different structures and operations of the dictionary information storage unit and the weighting unit shown in FIG. 2.

FIG. 6 illustrates different structures and operations of the dictionary information storage unit 7 and the weighting unit 8. The dictionary information which is the same as shown in FIG. 5 is used in the configuration of FIG. 6. The weighting unit 8 has a table memory 12 which stores weighting factors specified by both the maximum value related to the speaker-independent dictionary 5 and the maximum value related to the speaker-dependent dictionary 6.

Figure 7:
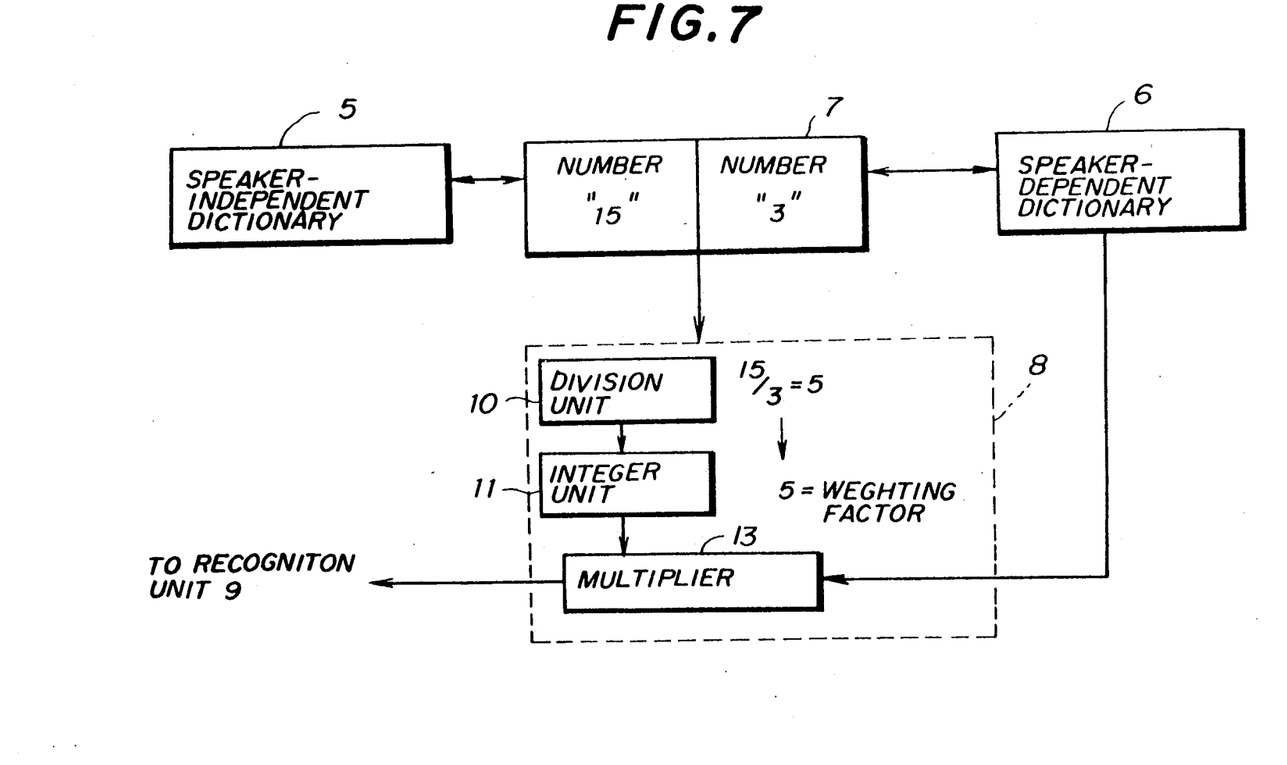
FIG. 7 is a block diagram illustrating different structures and operations of the dictionary information storage unit and the weighting unit shown in FIG. 2.

FIG. 7 illustrates different structures and operations of the dictionary information storage unit 7 and the weighting unit 8. The dictionary information used in FIG. 7 is composed of the number of patterns of the same word which are added when a reference pattern of this word to be registered in the speaker-independent dictionary 5 is created, and the number of patterns of the same word which are added when a reference pattern of the word to be registered in the speaker-dependent dictionary 6 is created. In the case shown in FIG. 7, 15 patterns of 15 different speakers are used for creating the corresponding reference pattern to be registered in the speaker-independent dictionary 5, and 3 patterns of the same speaker are used for creating the corresponding reference pattern to be registered in the speaker-dependent dictionary 6. The weighting unit 8 is composed of the division unit 10 and the integer unit 11 in the same way as the configuration shown in FIG. 5. The division unit 10 divides the number related to the speaker-independent dictionary 5 by the number related to the speaker-dependent dictionary 6. In the case shown in FIG. 7, the division unit 10 divides 15 by 3, and outputs the division result (equal to 5 in this case). The integer unit 11 extracts the integer part from the division result. The extracted integer part is the weighting factor. In the case shown in FIG. 7, the weighting factor is equal to 5.

Figure 8:
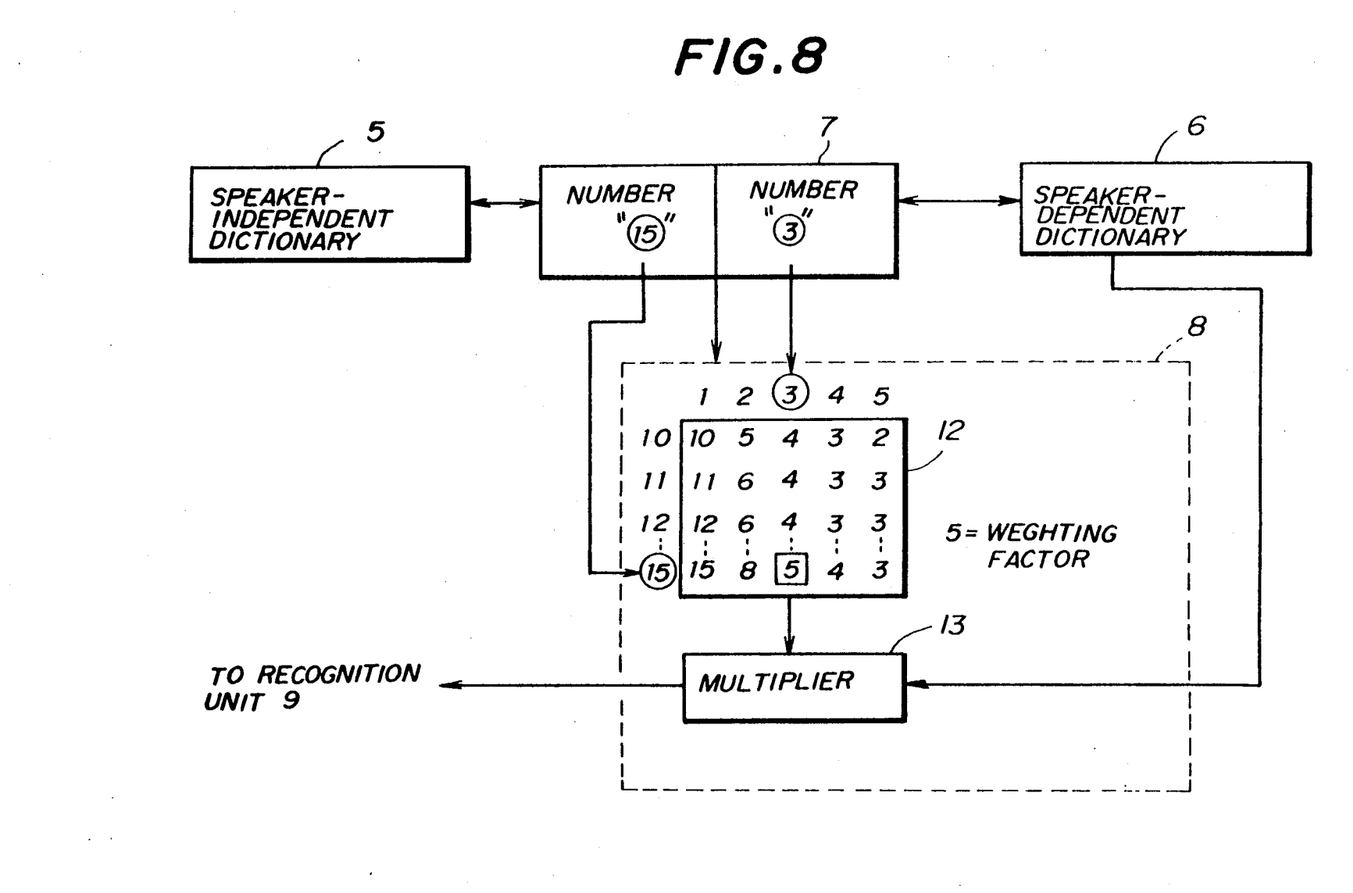
FIG. 8 is a block diagram illustrating different structures and operations of the dictionary information storage unit and the weighting unit shown in FIG. 2.

FIG. 8 illustrates different structures and operations of the dictionary information storage unit 7 and the weiqhtinq unit 8. The structure shown in FIG. 8 is obtained by combining the configuration shown in FIGS. 6 and 7. That is, the dictionary information is composed of the number of patterns of the same word which are added when a reference pattern of the word being considered to be registered in the speaker-independent dictionary 5 is created, and the number of patterns of the same word which are added when a reference pattern of the word being considered to be registered in the speaker-dependent dictionary 6 is created. The weighting unit 8 has a memory table 12 which stores weighting factors specified by the number related to the speaker-independent dictionary 5 and the number related to the speaker-dependent dictionary 6.

In the aforementioned embodiments of the present invention, one weighting factor is provided for one dictionary. Alternatively, it is possible to provide weighting factors for the respective reference patterns.

The present invention is not limited to the specifically disclosed embodiments, and variations and modifications may be made without departing from the scope of the present invention.

What is claimed is:

1. A speech recognition apparatus comprising:
  input means for receiving an input speech signal and for extracting features from said input speech;
  pattern generating means, coupled to said input means, for generating a speech pattern of said input speech from said features extracted by said input means, said speech pattern having a time-spectrum pattern showing frequency elements obtained at predetermined intervals;
  a speaker-independent dictionary for storing a first group of reference patterns, each obtained by adding a plurality of time-spectrum patterns of an identical word uttered by different speakers;
  a speaker-dependent dictionary for storing a second group of reference patterns, each obtained by adding time-spectrum patterns of an identical word uttered by an identical speaker;
  dictionary information storing means, coupled to said speaker-independent dictionary and said speaker-dependent dictionary, for storing dictionary information about said first group of reference patterns and said second group of reference patterns, the dictionary information storing means coupled to said pattern generating means so as to receive the speech pattern generated by the pattern generating means;
  weighting means, coupled to said speaker-dependent dictionary and said dictionary information storing means, for calculating a weighting factor from said dictionary information and for weighting said second group of reference patterns in said speaker-dependent dictionary by using said weighting factor to thereby output weighted reference patterns; and
  recognizing means, coupled to said pattern generating means, said speaker-independent dictionary and said weighting means, for recognizing said speech pattern of said input speech signal generated by said pattern generating means by using said first group of reference patterns in said speaker-independent dictionary and said weighted reference patterns supplied from said weighting means, so that said first group of reference patterns and said weighted reference patterns are equally handled, said recognizing means outputting a recognition result.

2. A speech recognition apparatus as claimed in claim 1, wherein said dictionary information comprises:
   a first maximum value of said frequency elements in said first group of reference patterns registered in said speaker-independent dictionary; and
   a second maximum value of said frequency elements in said second group of reference patterns registered in said speaker-dependent dictionary.

3. A speech recognition apparatus as claimed in claim 2, wherein said weighting means comprises:
   dividing means for dividing said first maximum value by said second maximum value and for outputting a divided result;
   integer extracting means, coupled to said dividing means, for extracting an integer from said divided result; and
   multiplying means, coupled to said speaker-dependent dictionary and said integer extracting means, for multiplying one of said second group of reference patterns registered in said speaker-dependent dictionary by said integer and for outputting a multiplied result which corresponds to one of said weighted reference patterns.

4. A speech recognition apparatus as claimed in claim 2, wherein said weighting means comprises:
   table memory means for storing predetermined weighting factors defined by possible first maximum values of said frequency elements of said first group of reference patterns and possible second maximum values of said frequency elements of said second group of reference patterns and for outputting one of said predetermined weighting factors defined by one of said possible first maximum values corresponding to said first maximum value and one of said possible second maximum values corresponding to said second maximum value, said one of the predetermined weighting factors corresponding to said weighting factor; and
   multiplying means, coupled to said speaker-dependent dictionary and said table memory means, for multiplying one of said second group of reference patterns registered in said speaker-dependent dictionary by said weighting factor and for outputting a multiplied result which corresponds to one of said weighted reference patterns.

5. A speech recognition apparatus as claimed in claim 1, wherein said dictionary information comprises:
   a first number corresponding to said plurality of patterns of said identical word used for creating one of said first group of reference patterns; and
   a second number corresponding to said plurality of patterns of said identical word used for creating one of said second group of reference patterns.

6. A speech recognition apparatus as claimed in claim 5, wherein:
   said weighting means comprises:
   dividing means for dividing said first number by said second number and for outputting a divided result;
   integer extracting means, coupled to said dividing means, for extracting an integer from said divided result; and
   multiplying means, coupled to said speaker-dependent dictionary and said integer extracting means, for multiplying one of said second group of reference patterns registered in said speaker-dependent dictionary by said integer and for outputting a multiplied result which corresponds to one of said weighted reference patterns.

7. A speech recognition apparatus as claimed in claim 5, wherein said weighting means comprises:
   table memory means for storing predetermined weighting factors defined by possible first maximum values of said frequency elements of said first group of reference patterns and possible second maximum values of said frequency elements of said second group of reference patterns and for outputting one of said predetermined weighting factors defined by one of said possible first maximum values corresponding to said first maximum value and one of said possible second maximum values corresponding to said second maximum value, said one of the predetermined weighting factors corresponding to said weighting factor; and
   multiplying means, coupled to said speaker-dependent dictionary and said table memory means, for multiplying one of said second group of reference patterns registered in said speaker-dependent dictionary by said weighting factor and for outputting a multiplied result which corresponds to one of said weighted reference patterns.

8. A speech recognition apparatus as claimed in claim 1, wherein said dictionary information storing means stores said dictionary information at the same time as said first and second groups of reference patterns are stored in said speaker-independent and speaker-dependent dictionaries, respectively.

* * * * *

UNITED STATES PATENT AND TRADEMARK OFFICE
CERTIFICATE OF CORRECTION

PATENT NO. : 5,144,672
DATED : September 1, 1992
INVENTOR(S) : Shoji Kuriki It is certified that error appears in the above-identified patent and that said Letters Patent is hereby corrected as shown below:

Title page, item [54] and col. 1, in the title, after "SPEAKER-DEPENDENT" insert

--DICTIONARY--.

Signed and Sealed this

Fourteenth Day of September, 1993

Attest:

BRUCE LEHMAN

*Attesting Officer*     *Commissioner of Patents and Trademarks*